United States Patent [19]

Todoh

[11] Patent Number: 4,494,126

[45] Date of Patent: Jan. 15, 1985

[54] THERMAL RECORDING HEAD DRIVE DEVICE

[75] Inventor: Hidemasa Todoh, Kanagawa, Japan

[73] Assignee: Fuji Xerox Co., Ltd., Tokyo, Japan

[21] Appl. No.: 465,412

[22] Filed: Feb. 10, 1983

[30] Foreign Application Priority Data

Feb. 12, 1982 [JP] Japan .................. 57-19750

[51] Int. Cl.³ .......................... G01D 15/10
[52] U.S. Cl. ............... 346/76 PH; 358/298; 219/216
[58] Field of Search ............ 346/76 PH; 358/283, 358/298; 219/216; 400/120

[56] References Cited

U.S. PATENT DOCUMENTS

| 4,071,849 | 1/1978 | Koyano et al. | 346/76 PH |
| 4,368,491 | 1/1983 | Saito | 346/76 PH |
| 4,391,535 | 7/1983 | Palmer | 346/76 PH |
| 4,401,993 | 8/1983 | Morigachi et al. | 346/76 PH |
| 4,449,033 | 5/1984 | McClure et al. | 346/76 PH |

Primary Examiner—E. A. Goldberg
Assistant Examiner—A. Evans
Attorney, Agent, or Firm—Sughrue, Mion, Zinn, Macpeak & Seas

[57] ABSTRACT

A thermal recording head drive device in which a uniform recording density is provided independent of temperature changes in the device. An analog shift register receives an analog input signal having an amplitude which varies according to the densities of picture elements to be recorded. The analog signal is shifted into the register until sufficient data is stored to provide parallel outputs corresponding to an entire line of picture elements to be recorded. Current control circuits are connected in series between respective outputs of the shift register and heat generating resistance elements of the recording head. A common connection terminal of the series circuits of the current control circuits and heat generating resistance elements is connected through a voltage control circuit to a power supply terminal. The internal impedance of the voltage control circuit is set in accordance with at least one detected temperature in or around the recording head which affects the recording density such as the substrate temperature of the head.

11 Claims, 7 Drawing Figures

THERMAL RECORDING HEAD DRIVE DEVICE

BACKGROUND OF THE INVENTION

The present invention relates to a drive device for a thermal recording head of a type used in a printer or facsimile device. More particularly, the invention relates to a thermal recording head drive device which is capable of performing half-tone recording.

Figure 1:
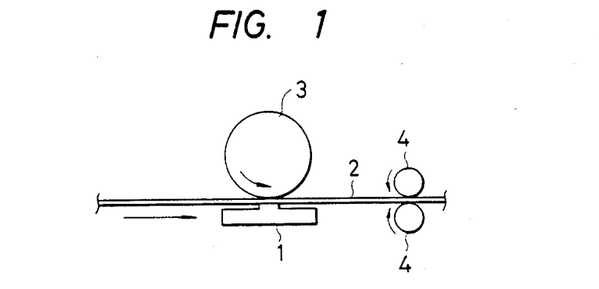
FIG. 1 is a side view illustrating the general arrangement of a thermal recording head device.

FIG. 1 is a side view outlining the general arrangement of a thermal recording head device. In FIG. 1, reference numeral 1 designates a thermal recording head, 2 a recording sheet, 3 a platen roll, and 4 drive rolls. A conventional thermal recording head device of this general type is composed of (1) a linear-type head including heat generating resistance elements arranged in an array extending in a direction perpendicular to the surface of the drawing having a length at least equal to the width of the heat-sensitive sheet 2, (2) the heat-sensitive sheet 2, which is driven past the head 1 by the drive rolls 4, and (3) the platen roll 3 for pressing the heat-sensitive sheet 2 against the head 1.

In a printer or facsimile device utilizing a conventional thermal recording system as described above, half-tone recording is carried out using an "artificial" method in which one recording element (dot) is divided into a plurality of areas. In recording data with a high density, a large number of areas are recorded. In order to perform recording with high fidelity, the number of areas obtained by so dividing one recording element must be large. However, the minimum size of an element in a recording head is limited. That is, it is impossible to reduce the size of the element beyond certain limits. On the other hand, if it is required to perform recording with a large number of gradations, the area of each recording element must be relatively large, with the result that the recording is low in resolution.

Another half-tone recording method is known in the art in which, based on the fact that the recording density vs. voltage application time characteristic of a heat-sensitive sheet is linear to some extent, in recording at a low density the voltage application time is decreased, while in recording at a high density the voltage application time is increased. This method is free from the above-described drawback of low resolution because one recorded element (dot) corresponds to one element of the head. However, the method is still disadvantageous in that, for high speed recording with a linear-type head having a length equal to the width of a recording sheet, it is necessary to provide pulse-width modulator circuits in a number equal to the total number of recording elements on the head. For instance, in the case of a head having a length equal to the short side (257 mm) of a size "B4" sheet and a density of a 8 dots/mm, the number of elements is 2056 (257×8). That is, it is necessary to provide 2056 pulse-width modulator circuits. This is not practical.

Further, it has been a problem in prior art thermal recording head drive devices that the recording density varies considerably as the temperature of the heat-sensitive recording sheet or the substrate temperature of the recording head changes. If these temperatures change outside a rather narrow operating range, the recording density tends to become irregular and the recorded image low in quality.

Accordingly, it is an object of the present invention to provide a thermal recording head drive device of low cost and small size in which heat-sensitive recording operations of half-tone recording can be carried out at a high speed and with a high resolution.

It is a further object of the present invention to provide such a thermal recording head drive device in which a uniform recording density is achieved throughout a broad temperature range.

SUMMARY OF THE INVENTION

In a heat-sensitive recording head drive device of the invention, analog video signals for recording a complete line are supplied to an analog shift register, and currents are supplied to heat generating resistance elements of the thermal recording head corresponding to the parallel outputs of the video signal from the various positions (stages) of the register.

Current control circuits are connected in series between the heat generating resistance elements and the parallel outputs of the video signals from the various positions of the register. A voltage control circuit is connected in series between a common connection terminal of the series circuits of the heat generating resistance elements and the corresponding current control circuits and one terminal of a resistance element drive power source. At least one temperature detecting device is provided for detecting a temperature at a point where the temperature affects the recording density, for instance, at the substrate of the head or at the recording sheet. A parameter of the voltage control circuit, such as its internal impedance, is controlled in accordance with the temperature thus detected.

DESCRIPTION OF THE PREFERRED EMBODIMENTS

Figure 2:
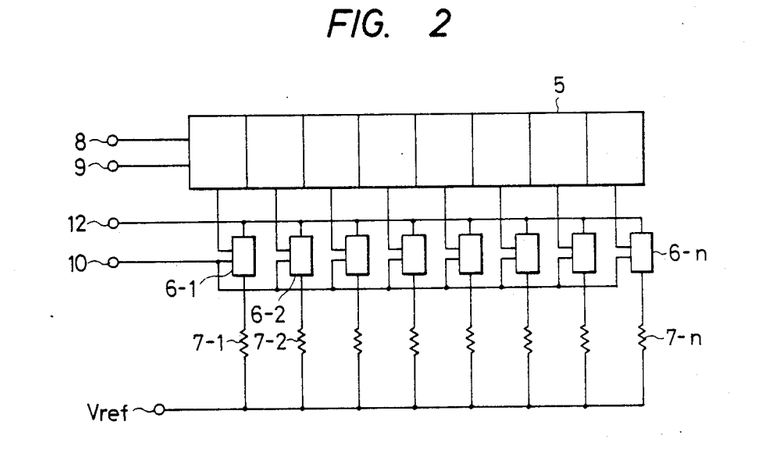
FIG. 2 is a block diagram showing an example of a recording head drive device for half-tone recording.

FIG. 2 is a block diagram illusting a heat-sensitive recording head drive device. In FIG. 2, reference numeral 5 designates an analog shift register; 6-1, 6-2 . . . 6-n current limiting circuits; 7-1, 7-2 . . . 7-n heat generating resistance elements; 8 an analog signal input terminal; 9 a clock input terminal; 10 an enable input terminal; and 12 a resistance element drive source terminal. Such an analog shift register is well known in the art, an example thereof being disclosed in the Japanese journal "Denshi Gijutsu" (Electronic Techniques), January 1979, pp. 31 to 39 and in the Japanese journal "Denshi Tembo" (Electronics Prospective), November 1979, pp. 31 to 42. As such a conventional analog shift register is suitably employed in the invention, a further detailed description thereof is omitted. Further in FIG. 2, reference character $V_{ref}$ designates a reference potential.

In operation, an analog input signal, which is applied to the input terminal 8 of the analog shift register 5 bit by bit, is shifted to the right bit by bit in synchronization with an external clock signal applied to the clock input terminal 9. The current control circuits 6-1, 6-2, ... 6-n, inputs of which are connected to respective bit positions (stages) of the analog shift register 5, control currents flowing in the respective heat generating resistance elements 7-1 through 7-n according to the analog voltages thus received. Accordingly, the magnitude of currents supplied to the heat generating resistance elements 7-1 through 7-n, and hence the amounts of heat energy generated in the resistance elements, correspond to the amplitude of the analog voltage representing the picture elements. In this manner, halftone images can be recorded.

The external enable signal supplied to the input terminal 10 may be applied a predetermined time after signals for one complete line of a picture have been stored in the analog shift register 5 so that recording for the whole line is carried out simultaneously. The same effect can be obtained if the enable input terminal 10 is omitted and the resistance element drive source is turned on and off by the external enable signal.

Figure 3:
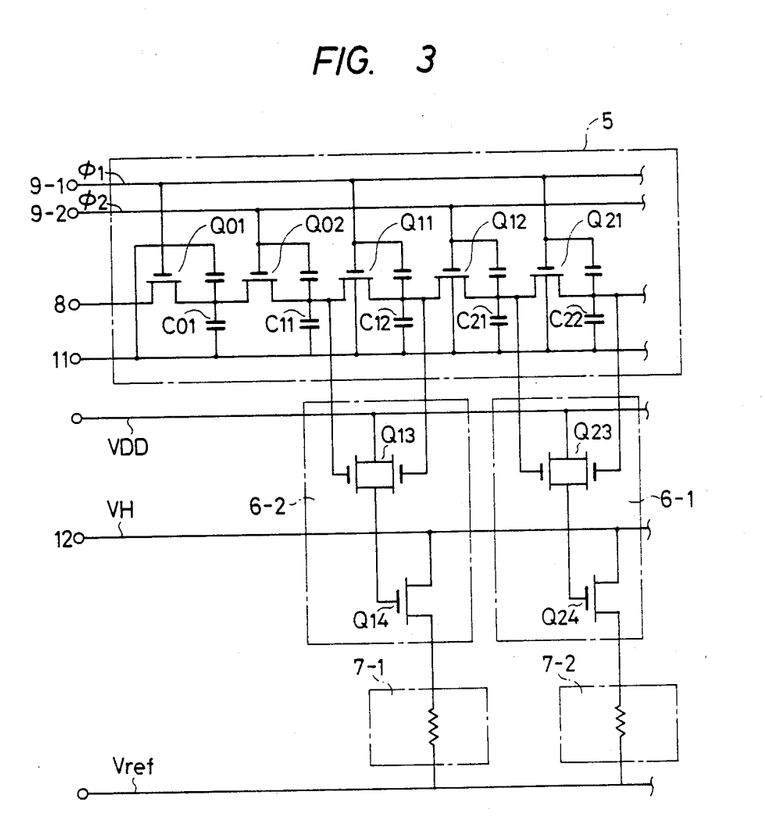
FIG. 3 is a circuit diagram showing a specific circuit implementation of the device of FIG. 2.

FIG. 3 is a circuit diagram showing a heat-sensitive recording head drive device in which the analog shift register 5, the current control circuits 6-1 through 6-n, etc. are illustrated in more detail. In FIG. 3, components corresponding functionally to those shown in FIG. 2 are designated by the same reference numerals or characters. Further in FIG. 3, reference numerals 9-1 and 9-2 designate clock input terminals to which clock pulse signal $\phi1$ and $\phi2$, which are opposite in phase to one another, are applied. Reference numeral 11 designates a ground terminal.

In the circuit of FIG. 3, the analog shift register 5 is a conventional series-parallel conversion type BBD (Bucket Brigade Device). As is apparent from FIG. 3, in the analog shift register 5, one bit cell (stage) is composed of two N-channel MOSFETs (Q11 and Q12 for bit number 1) and four capacitors (C11 and C12 for bit number 1). The bit cells are cascade-connected, and parallel outputs are provided from the bit cells. The current control circuits 6-1, 6-2, etc. are composed of N-channel MOSFETs (Q13, Q14, Q23, Q24, etc.) which are formed on the same silicon chip as the shift register 5. The MOSFETs Q14, Q24 etc. are connected through the heat generating resistance elements 7-1, 7-2, etc. to a resistance element drive source (not shown).

The heat generating resistance elements 7-1, 7-2, etc. may be film-type resistors. For instance, if the width of the recording head is 256 mm and the recording dot density is 8 dots/mm, it is necessary to provide 2048 heat generating resistance elements.

In experiments performed by the inventors, the analog shift register 5 and the current control circuits 6-1, 6-2, etc. were fabricated using 32 integrated circuits, each having 64 bits on the same silicon chip. The circuits were cascade-connected and mounted on the ceramic substrate of the recording head.

Figure 4:
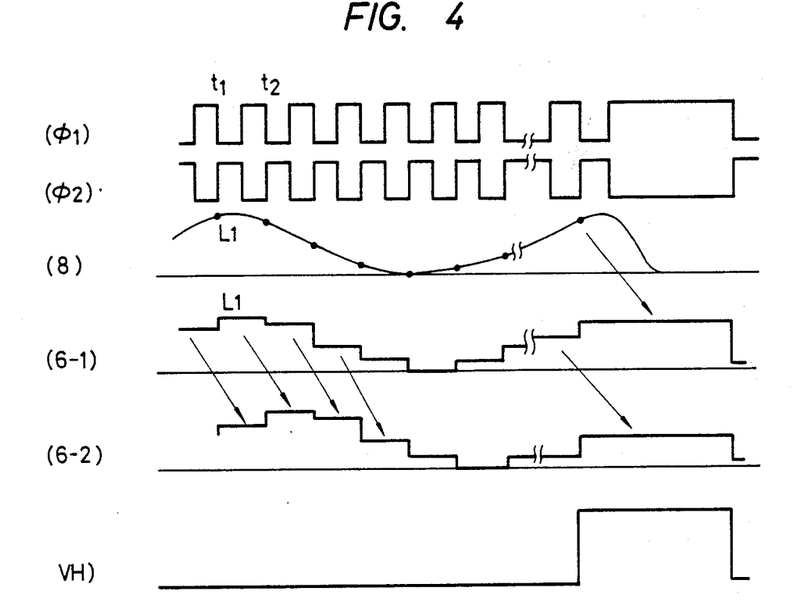
FIG. 4 is a timing chart for a description of the operation of the circuit of FIG. 3.

The operation of the heat-sensitive recording head drive device of FIG. 3 will now be described with reference to the timing chart of FIG. 4.

Clock signals $\phi1$ and $\phi2$ (FIG. 4) supplied to the clock input terminals 9-1 and 9-2 are of two phases, each having a frequency of 2 MHz, for instance. The analog video input signal supplied to the input terminal 8 has a continuous voltage waveform as indicated at (8) in FIG. 4. The analog input signal is applied to the drain of the FET Q01. This analog input signal is received when the clock signal $\phi1$ is at a high logical level (hereinafter "H") and the FET Q01 is rendered conductive. When the clock signal $\phi1$ falls, the peak value of the analog input signal voltage level is stored on the capacitor C01. Also, when the clock signal $\phi1$ falls, the clock signal $\phi2$ rises. Therefore, the FET Q01 is rendered non-conductive (off) while the FET Q02 is rendered conductive (on), so that the input voltage, which has been stored on the capacitor C01, is applied to the capacitor C11 in the next stage. In the above-described manner, the input voltage applied to the analog signal input terminal 8 is shifted to the right in the shift register 5 at a rate determined by the period of the clock signals.

The gate voltages of FETs Q13, Q23, etc., for the period between two successive falls of the clock signal $\phi1$ received by the corresponding capacitors at the first fall of the clock signal are outputted. The output voltages of the FETs Q13, Q23, etc. are applied to the gates of the respective current controlling FETs Q14, Q24, etc., the channels of which are connected in series with the respective heat generating resistance elements 7-1, 7-2, etc.

The terminal 12, which is connected to the drains of the FETs Q14, Q24, etc. in the current control circuits 6-1, 6-2, etc., is further connected to the resistance element drive source (not shown). As is apparent from FIG. 4, the resistance element drive source voltage $V_H$ is not applied during the period in which the analog signal input is being received through the signal input terminal 8, shifted and stored. Accordingly, while signals for one line are being introduced into the shift register 5, no voltages are applied to the current-controlling FETs Q14, Q24, etc. and the heat generating resistance elements 7-1, 7-2, etc. That is, irrespective of the application of the analog signal input, no current flows in the heat generating resistance elements 7-1, 7-2, etc.

After analog signals for one complete line have been inputted to the shift register 5, the voltage $V_H$ is applied to the terminal 12, whereupon all 2048 heat generating resistors elements 7-1, 7-2, etc. are energized simultaneously to effect recording of the entire line simultaneously. In the recording operation, the magnitudes of currents flowing in the heat generating resistance elements are controlled in accordance with the gate voltages of the FETs Q14, Q24, etc., that is, by the signal voltages stored on the capacitors in the various stages of the shift register 5.

According to experiments on the circuit in FIG. 3 performed by the inventor, the time for energization was 0.8 msec, and the time required for transferring the analog input signal (the time required for storing video signals for one line in the shift register) was 1.024 msec (0.5 msec×2048). Accordingly, the recording time per line was 1.824 msec. The recording operation was achieved at a rate of about three seconds per "A4" size sheet. It goes without saying that the recording time can be further reduced by skipping white lines utilizing well-known techniques.

In the above-described experiments, the voltages at various points in the circuit were as follows: the clock signals $\phi1$ and $\phi2$ were 0 (L) or +15 V (H), the analog signal input varied between 0 and 13 V, the drain voltages of the FETs Q13, Q23, etc. in the current control circuits were +15 V, the drain voltages $V_H$ of the FETs Q14, Q24, etc. were +15 V, and the reference voltage $V_{ref}$ was 0 V (ground). The average value of the resistances of the heat generating resistance elements 7-1, 7-2, etc. was 210Ω. As voltages 0 to 13 V (equal to the analog signal input) were applied to the resistance elements, the power supplied to each of the resistance elements 7-1, 7-2, etc. was about 0.8 W at the maximum.

In a recording operation under the above-described conditions, the recording density varied continuously between 0 and 12, and a half-tone record exhibiting excellent clarity was obtained with a resolution of 8 dots/mm. In the above-described device, only one analog signal input line was provided, and all the shift registers of thirty-two chips were cascade-connected. That is, after data for one line supplied through the input terminal 8 was successively received and stored in the shift registers, currents were applied to the heat generating resistance elements. In this case, the time required for inputting the signals was 1.024 msec.

Figure 5:
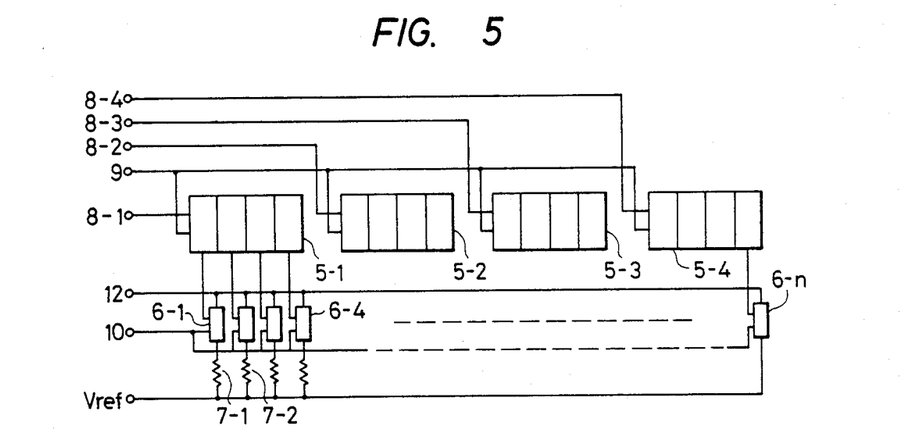
FIG. 5 is a block diagram showing another example of a recording head drive device for half-tone recording.

The shift register 5 may be divided into four blocks 5-1, 5-2, 5-3 and 5-4 (512 bits per block) with analog signal input terminals 8-1 through 8-4 provided for these blocks, as shown in FIG. 5. In FIG. 5, those components which have been described with reference to FIG. 2 are designated by the same reference numerals or characters. In this arrangement, signals can be inputted to the four blocks at the same time, so that, in the described example, the time required for inputting analog signals is reduced to 0.256 msec. Accordingly, the time required for recording data for one line is reduced to about 1 msec (which is the sum of the signal inputting time 0.256 and the heat generating resistance element energizing time 0.8 msec). The number of blocks which obtained by subdividing the shift register 5 can be selected according to the requirements of the system. Increasing the number of blocks of course provides for faster recording operations.

As to the arrangement of the integrated circuit, latch circuits for temporarily storing data may be provided between the outputs of the shift register 5 and the corresponding current controlling FETs Q14, Q24, etc. That is, latch circuits (temporary memory circuits) may be provided between the FETs Q13, Q23, etc. and the current-controlling FETs Q14, Q24, etc. shown in FIG. 3. In this arrangement, immediately after signals for one complete line have been inputted, the signals can be transferred to the latch circuits, so that, while currents are being applied to the heat generating resistance elements, signals for the next line are inputted. Furthermore, as in this case inputting of signals to the shift register and thermal recording with the resistance elements can be carried out in a parallel mode, the time required for inputting the signals is economically utilized, as a result of which data for one line can be recorded in 0.8 msec.

While a direct thermal recording system using heat-sensitive recording sheets has been described, it can be readily understood that the same method is applicable to a transfer type heat-sensitive recording system in which an ink film coated with meltable and fusible ink is used to record data on an ordinary sheet of paper.

In the above-described arrangement, a BBD element is employed as the analog shift register. However, the shift register can also be implemented with a CCD (Charge Coupled Device).

As is clear from the above description, with the device shown in FIG. 2 or 5, in a printer or a facsimile device using a thermal recording system, half-tone recording can be carried out with a high resolution and at a high speed.

Figure 6:
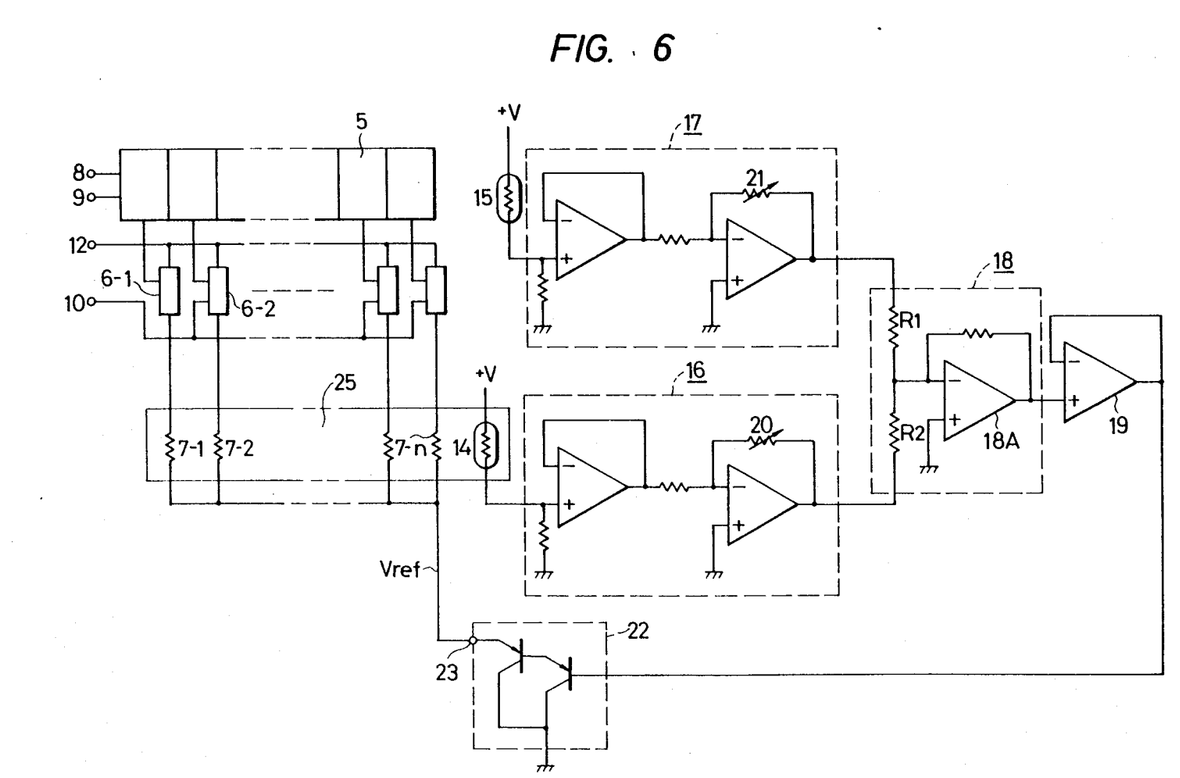
FIG. 6 is a block diagram showing an embodiment of the drive device of the invention.

In the above-described thermal recording head drive devices, the terminals of the heat generating resistance elements 7-1, 7-2, etc., which are opposite to the terminals thereof which are connected to the current control circuits, are commonly connected to a fixed potential $V_{ref}$. In this arrangement, the stability of the device of recording under various environmental conditions, such as high temperatures, can be improved by using an arrangement as shown in FIG. 6. In FIG. 6, components corresponding functionally to those already described with reference to FIG. 2 are designated by corresponding reference numerals or characters.

In FIG. 6, reference numeral 14 designates a first thermistor for detecting the temperature of the head substrate 25 on the surface of which the heat generating resistance elements 7-1 through 7-n are formed, and 15 a second thermistor for detecting an operating temperature of the system in which the device is used, for example, the temperature of a heat-sensitive recording sheet or the ambient air temperature. Further in FIG. 6, reference numerals 16 and 17 designate amplifiers for amplifying the respective outputs of the first and second thermistors, and 18 an average value circuit including an operational amplifier 18A. The inverting input terminal of the operational amplifier 18A is connected to the output terminals of the amplifiers 16 and 17 through resistors R1 and R2, respectively, while the noninverting input terminal is grounded. Further in FIG. 6, reference numeral 19 designates an output amplifier for amplifying the output of the average value circuit 18, reference numerals 20 and 21 indicate variable resistors for controlling the amplification factors of the respective amplifiers 16 and 17, and 22 designates a voltage control circuit connected between the common connection terminal 23 of the heat generating resistance elements 7-1 through 7-n and ground. In this circuit arrangement, the voltage control circuit 22 has an operating parameter, such as internal impedance, controlled by the output of the output amplifier 19.

The operation of the circuit in FIG. 6 will now be described. When the temperature of the head substrate 25 is increased during the operation of the thermal recording head, the resistance of the first thermistor 14 is decreased and the output voltage developed across the first thermistor 14 is increased. The amplified output voltage is inverted and amplified again by the amplifier 16. Therefore, the output of the amplifier 16, which is applied across the resistor R1, decreases as the temperature of the substrate 25 increases. The same is true with respect to the device operating temperature detected by the second thermistor 15. That is, as the detected temperature increases, the output of the second thermistor 15 increases and the output of the amplifier 17 decreases.

The outputs of the amplifiers 16 and 17 are supplied through corresponding resistors R1 and R2 to the average value circuit 18. The simple means of the two outputs is obtained by employing resistors R1 and R2 which are of equal resistors. However, by suitably selecting the values of the resistors R1 and R2 and/or by suitably setting the amplification factors of the amplifiers 16 and 17, a weighted mean can be obtained as desired according to the factors of contribution to recording density variation of the temperature of the head substrate and the operating temperature of the device. In general, the factor of contribution to recording density of the substrate temperature is different from the factor of contribution to recording density of the operating temperature of the device, the former generally being more significant than the latter. The factors of contribution can be obtained through experiment in advance.

In an experiment carried out by the inventors, the factor of contribution of the substrate temperature was found to be higher by about 30% than the factor of contribution of the operating temperature of the device. Therefore the amplification factor of the amplifier 16 was made higher by 30% than that of the amplifier 17 by suitably adjusting the variable resistors 20 and 21. The resistors R1 and R2 were set equal in resistance to each other.

The mean value signal which is obtained in the above-described manner is inverted and amplified by the amplifier 18A. Accordingly, a positive characteristic (non-inverted) signal which increases as the temperature of the head substrate or the selected operating temperature of the device increases is obtained at the output terminal of the amplifier 18A.

The output of the amplifier 18A is amplified by the output amplifier 19 and then supplied to the voltage control circuit 22. The internal impedance of the voltage control circuit 22 is thus increased with an increasing output of the output amplifier 19. Accordingly, the potential at the common connection terminal 23 of the heat generating resistance elements 7-1 through 7-n increases as the temperature of the head substrate or the operating temperature of the device increases, as a result of which the voltage applied across the heat generating resistance elements 7-1 through 7-n decreases. Therefore, the amounts of heat generated by the heat generating resistance elements 7-1 through 7-n decrease with increasing temperature, whereby undesirable increases in recording density attributed to a rise of the temperature of the head substrate or the operating temperature of the device are opposed and cancelled out.

As is clear from the above description, according to the invention, the temperature of the substrate of the thermal head and/or the operating temperature of the device is detected, and the voltages applied to the heat generating resistance elements are controlled according to the variations of temperature thus detected. Accordingly, irregularities in recording density attributed to such temperature variations are eliminated, and hence a half-tone image can be recorded with high fidelity.

In order to confirm the effects of the invention, recording was carried out with a heat-sensitive recording head drive device which was constructed in accordance with FIGS. 2, 3 and 6, under the conditions that the operating temperature of the device ranged between 0° C. and 45° C. and the substrate temperature of the head was varied in a range of 0° C. to 60° C. Also, the following conditions were maintained:
Clock signals $\phi_1$ and $\phi_2$: 0 (L) and +1.5 V (H)
Analog input signal: 0 to 13 V
Drain voltage $V_{DD}$: +15 V
Drive source voltage $V_H$: +15 V
Reference voltage $V_{ref}$: −10 to +5 V With these ranges, the recording density varied continuously between 0 and 1.2 (according to the analog input), and the recorded half-tone image, which had a resolution of 8 dots/mm, had excellent clarity, satisfactory quality, and high fidelity.

As described above, a thermistor can be employed as a temperature detecting element. However, that device may be replaced by a thermocouple. The temperature detecting position is not limited to being near the heat substrate or the heat-sensitive sheet, and any location the temperature of which affects the recording density is sufficient. Furthermore, although plural temperature detecting locations are employed in the above-described embodiment, a single location may be used if desired.

Figure 7:
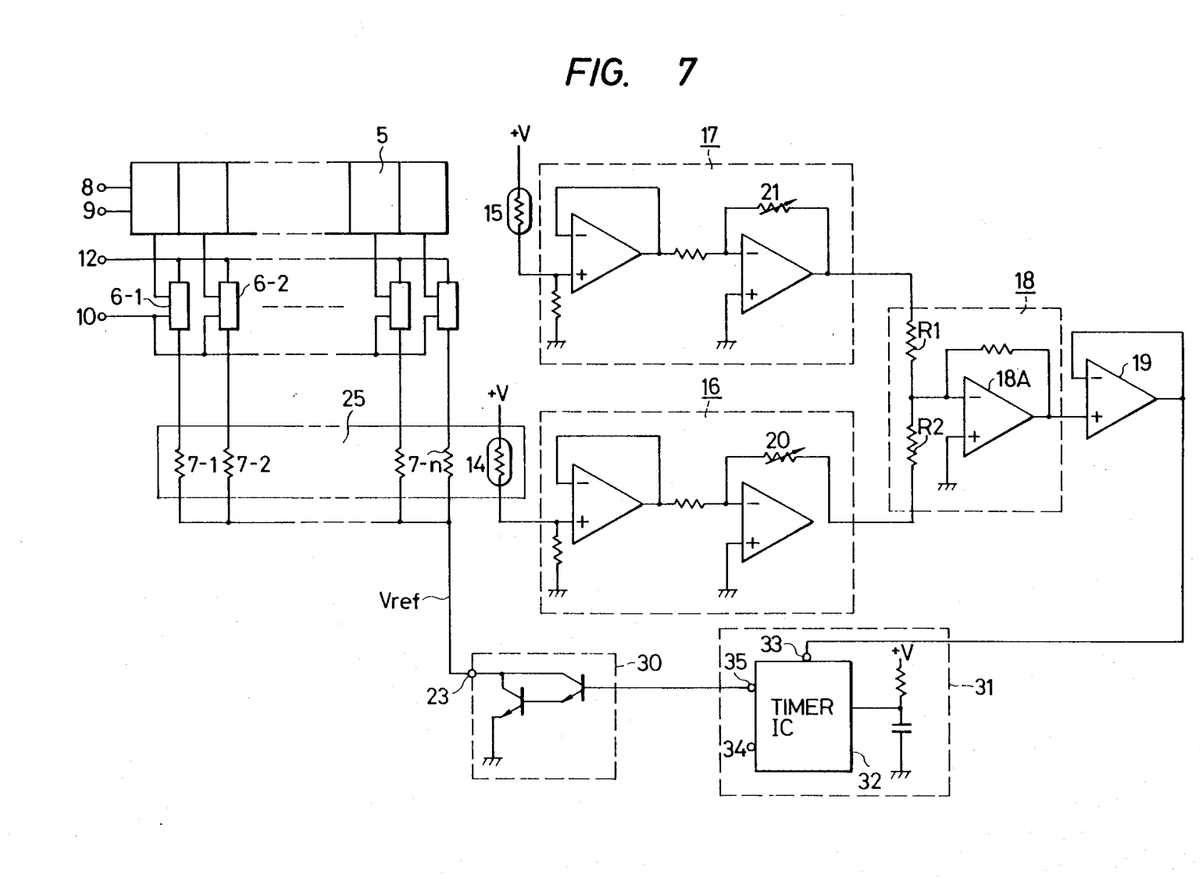
FIG. 7 is a block diagram showing another embodiment of a drive device of the invention.

In the above-described embodiment, the reference potential $V_{ref}$ is described as being varied continuously with temperature. However, the same effect can be obtained by varying the applied pulse width with variations of temperature with the magnitude of the reference potential fixed. For this purpose, and as shown in FIG. 7, a technique may be employed in which the voltage control circuit 22 in FIG. 6 is replaced by a switching element 30 with the time of closure of the latter being controlled according to the output of the amplifier 19. This control can be readily achieved by the utilization of a timer controlled by a computer. Reference numeral 31 designates a pulse width modulating circuit used to control the time of closure of the switching element 30; 32, a timer IC (for example, NE 555 signetics); 33, a voltage control input terminal; 34, a trigger input terminal; and 35, an output terminal.

While the invention has been described with reference to the case where half-tone recording is carried out, it can be readily understood that the technical concept of the invention is applicable to a binary data recording thermal recording head.

I claim:
1. A thermal recording head drive device in which a plurality of heat generating resistance elements are arranged in an array over a recording width, comprising:
an analog shift register which receives an analog input signal the amplitude of which varies according to densities of picture elements to be recorded, said analog shift register shifting said analog signal input bit by bit according to a clock signal to provide parallel outputs corresponding to an entire line of picture elements to be recorded;
current control circuit means for controlling currents flowing in respective ones of said heat generating resistance elements, said current control circuit means being connected in series with respective ones of said heat generating resistance elements, and said current control circuits receiving said parallel outputs of said shift register;
voltage control circuit means connected in series between a common connection terminal of series circuits of said heat generating resistance element and respective current control circuit means and a power source terminal;
means for detecting a temperature at at least one predetermined position in said device the temperature of which affects a recording density of picture elements recorded by the recording head drive device; and
means for controlling a predetermined parameter of said voltage control circuit according to the detected temperature, wherein after analog signals representing an entire line of picture elements to be recorded have been stored in said analog shift register, currents are applied through said heat generating resistance elements for a predetermined period of time according to the corresponding outputs of said shift register and to said parameter of said voltage control circuit means.

2. The recording head drive device of claim 1, wherein said means for detecting a temperature at at least one location in said device comprises means for detecting a temperature of a head substrate associated with said heat generating resistance elements.

3. The thermal recording head drive device of claim 2, wherein said means for detecting a temperature at at least one location in said device further comprises means for detecting a temperature of a heat-sensitive recording sheet being recorded upon by said heat generating resistance elements.

4. The thermal recording head drive device as claimed in claim 3, wherein said means for detecting a temperature at at least one location in said device further comprises means for producing a weighted average of temperatures detected by said means for detecting a temperature of a head substrate and said means for detecting said temperature of said recording sheet.

5. The thermal recording head drive device of claim 4, wherein said means for detecting a temperature of said head substrate and said means for detecting said temperature of said recording sheet each comprise a first operational amplifier having a temperature sensing resistance element connected to one input terminal thereof and a second operational amplifier for amplifying an output of said first operational amplifier; and wherein said means for producing said weighted average comprises a third operational amplifier and first and second resistors connecting respective outputs of said second operational amplifiers to an input of said third operational amplifier, at least one of gains of said second operational amplifiers and resistances of said first and second resistors being set to achieve a predetermined weighting ratio.

6. The thermal recording head drive device of claim 1, wherein said voltage control circuit comprises a Darlington-connected transistor having a base connected to an output of said third operational amplifier.

7. A thermal recording head drive device in which a plurality of heat generating resistance elements are arranged in an array over a recording width, comprising:
an analog shift register which receives an analog input signal the amplitude of which varies according to densities of picture elements to be recorded, said analog shift register shifting said analog signal input bit by bit according to a clock signal to provide parallel outputs corresponding to an entire line of picture elements to be recorded;
current control circuit means for controlling currents flowing in respective ones of said heat generating resistance elements, said current control circuit means being connected in series with respective ones of said heat generating resistance elements, and said current control circuits receiving said parallel outputs of said shift register;
switching means connected in series between a common connection terminal of series circuits of said heat generating resistance elements and respective current control circuit means and a power source terminal;
means for detecting a temperature at at least one predetermined position in said device the temperature of which affects a recording density of picture elements recorded by the recording head drive device; and
means for controlling a time of closure of said switching means according to the detected temperature, wherein after analog signals representing an entire line of picture elements to be recorded have been stored in said analog shift register, currents are applied through said heat generating resistance elements for a predetermined period of closure of said switching elements with an amplitude determined by the corresponding outputs of said shift register.

8. The recording head drive device of claim 7, wherein said means for detecting a temperature at at least one location in said device comprises means for detecting a temperature of a head substrate associated with said heat generating resistance elements.

9. The thermal recording head drive device of claim 8, wherein said means for detecting a temperature at at least one location in said device further comprises means for detecting a temperature of a heat-sensitive recording sheet being recorded upon by said heat generating resistance elements.

10. The thermal recording head drive device of claim 9, wherein said means for detecting a temperature at at least one location in said device further comprises means for producing a weighted average of temperatures detected by said means for detecting a temperature of a head substrate and said means for detecting said ambient temperature.

11. The thermal recording head drive device as claimed in claim 10, wherein said means for detecting a temperature of said head substrate and said means for detecting said temperature of said recording sheet each comprise a first operational amplifier having a temperature sensing resistance element connected on one input terminal thereof and a second operational amplifier for amplifying an output of said first operational amplifier; and wherein said means for producing said weighted average comprises a third operational amplifier and first and second resistors connecting outputs of said second operational amplifiers to an input of said third operational amplifier, at least one of gains of said second operational amplifiers and resistances of said first and second resistors being set to achieve a predetermined weighting ratio.

* * * * *